(12) United States Patent
Ishikawa et al.

(10) Patent No.: US 11,733,679 B2
(45) Date of Patent: Aug. 22, 2023

(54) MASTER MACHINE SUPPORTING SYSTEM

(71) Applicant: SUMITOMO HEAVY INDUSTRIES, LTD., Tokyo (JP)

(72) Inventors: Tetsuzou Ishikawa, Aichi (JP); Jun Tamenaga, Aichi (JP); Kenji Matsunaga, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 215 days.

(21) Appl. No.: 16/563,312

(22) Filed: Sep. 6, 2019

(65) Prior Publication Data

US 2019/0391566 A1 Dec. 26, 2019

Related U.S. Application Data

(63) Continuation of application No. PCT/JP2018/009807, filed on Mar. 13, 2018.

(30) Foreign Application Priority Data

Mar. 29, 2017 (JP) .............................. JP2017-065803

(51) Int. Cl.
*B25J 9/10* (2006.01)
*G05B 19/4155* (2006.01)
*B25J 13/00* (2006.01)

(52) U.S. Cl.
CPC .......... *G05B 19/4155* (2013.01); *B25J 9/102* (2013.01); *B25J 13/006* (2013.01); *G05B 2219/50391* (2013.01)

(58) Field of Classification Search
CPC .............. G05B 19/4155; G05B 19/418; G05B 19/404; G05B 2219/37209;
(Continued)

(56) References Cited

U.S. PATENT DOCUMENTS

2006/0213307 A1 9/2006 Haga et al.
2009/0200978 A1 8/2009 Kato et al.
(Continued)

FOREIGN PATENT DOCUMENTS

DE 11-2013-002681 T5 3/2015
EP 2 090 407 A1 8/2009
(Continued)

OTHER PUBLICATIONS

International Search Report issued in Application No. PCT/JP2018/009807, dated Jun. 19, 2018.
(Continued)

*Primary Examiner* — Khoi H Tran
*Assistant Examiner* — Tanner L Cullen
(74) *Attorney, Agent, or Firm* — Michael Best & Friedrich LLP

(57) ABSTRACT

A master machine supporting system includes a master machine in which a speed reducer is incorporated, and a server configured to store performance data of the speed reducer in association with a speed reducer ID of each speed reducer. The server transmits performance data corresponding to the speed reducer ID in response to a performance data transmission request including the speed reducer ID. The master machine receives an input of the performance data of the speed reducer incorporated in the master machine and controls an operation of the master machine based on the input performance data.

19 Claims, 14 Drawing Sheets

(58) Field of Classification Search
CPC . G05B 2219/50391; G05B 2219/41359; B25J 9/102; B25J 9/1653; B25J 13/006; B25J 13/00; H02P 29/00; F16H 2057/02073
See application file for complete search history.

(56) References Cited

U.S. PATENT DOCUMENTS

| | | | |
|---|---|---|---|
| 2011/0204838 A1* | 8/2011 | Nakasugi | B25J 9/1641 318/689 |
| 2012/0065781 A1* | 3/2012 | Ikeda | B25J 9/1674 700/261 |
| 2013/0151214 A1* | 6/2013 | Ryou | G05B 19/404 703/2 |
| 2014/0379128 A1* | 12/2014 | Ishikawa | B25J 9/1674 700/250 |
| 2015/0306768 A1* | 10/2015 | Liang | B25J 9/1671 703/2 |
| 2016/0070247 A1* | 3/2016 | Ohishi | H02P 23/12 700/275 |
| 2017/0087719 A1* | 3/2017 | Tsuchiya | G05B 19/4065 |
| 2018/0264645 A1* | 9/2018 | Shin | B25J 9/126 |

FOREIGN PATENT DOCUMENTS

| | | | | |
|---|---|---|---|---|
| JP | H01-210643 A | 8/1989 | | |
| JP | H03-282703 A | 12/1991 | | |
| JP | H10-315170 A | 12/1998 | | |
| JP | 2006-263878 A | 10/2006 | | |
| JP | 2007-260834 A | 10/2007 | | |
| JP | 2011-224662 A | 11/2011 | | |
| JP | 2011224662 A | * 11/2011 | ............... | B25J 9/10 |
| JP | 2012-056037 A | 3/2012 | | |
| JP | 2013-244564 A | 12/2013 | | |
| JP | 2013244564 A | * 12/2013 | ............ | B25J 9/1674 |
| KR | 10-2017-0004657 A | 1/2017 | | |
| WO | WO-2010017835 A1 | * 2/2010 | ............ | B25J 9/1671 |

OTHER PUBLICATIONS

Office Action issued in German Application No. 11 2018 001 716.8, dated May 19, 2020.

* cited by examiner

MASTER MACHINE SUPPORTING SYSTEM

RELATED APPLICATIONS

The content of Japanese Patent Application No. 2017-065803, and of International Patent Application No. PCT/JP2018/009807, on the basis each of which priority benefits are claimed in an accompanying application data sheet, are in their entirety incorporated herein by reference.

BACKGROUND

Technical Field

Certain embodiments of the present invention relate to a master machine supporting system.

Description of Related Art

An industrial robot is an example of a master machine. In the industrial robot, a speed reducer is incorporated in a joint portion of an armor the like. For example, in the related art, an industrial robot is suggested in which an eccentrically oscillating type speed reducer is incorporated in a joint portion.

SUMMARY

According to an embodiment of the present invention, there is provided a master machine supporting system including: a master machine in which a speed reducer is incorporated; and a server configured to store performance data of the speed reducer in association with a speed reducer ID of each speed reducer. The server transmits performance data corresponding to the speed reducer ID in response to a performance data transmission request including the speed reducer ID, and the master machine receives an input of the performance data of the speed reducer incorporated in the master machine and controls an operation of the master machine based on the input performance data.

DETAILED DESCRIPTION

Figure 1:
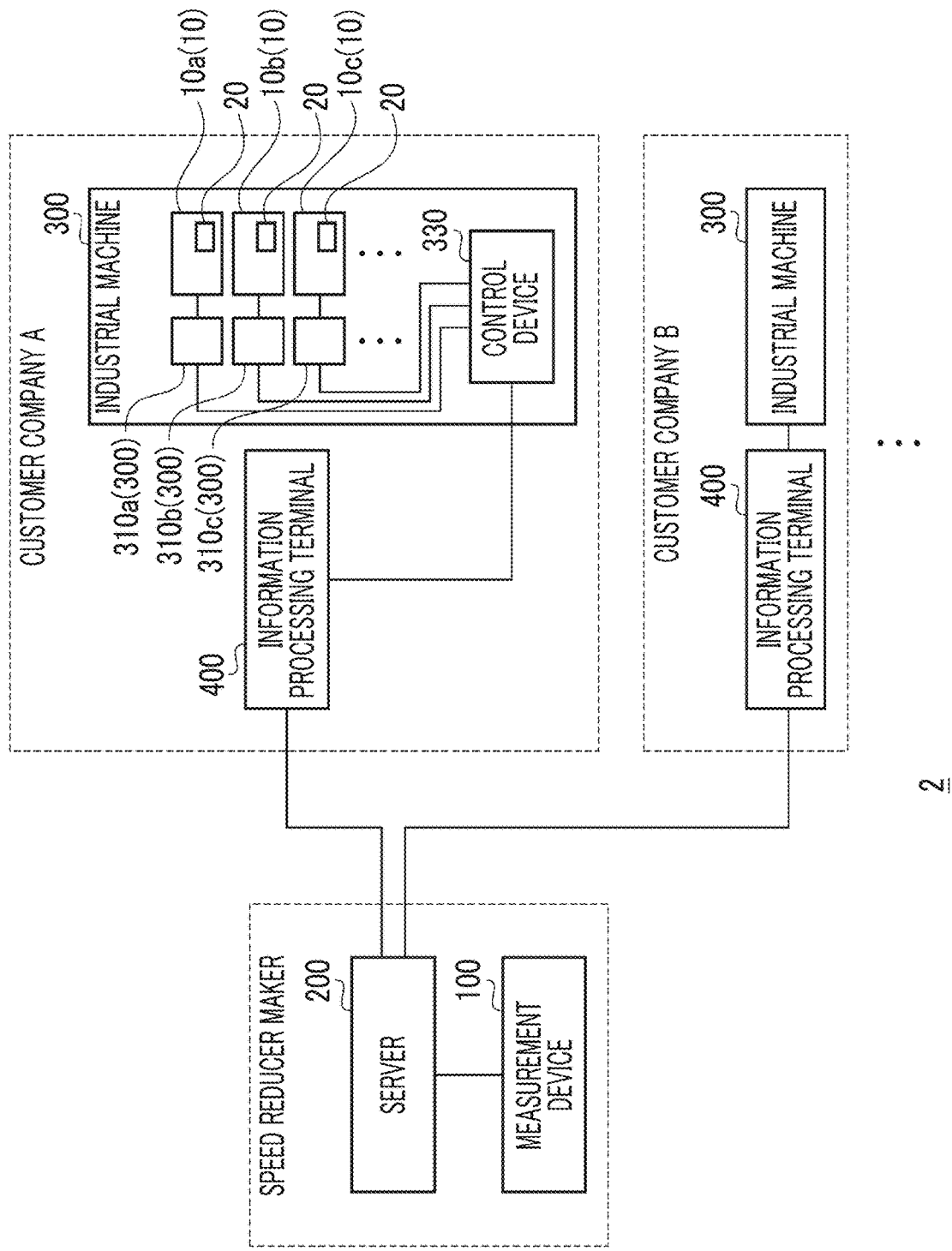
FIG. 1 is a schematic view showing a configuration of an industrial machine supporting system according to a first embodiment.

An industrial robot is required to have high trajectory accuracy and positioning accuracy. An individual difference in speed reducers greatly affects the trajectory accuracy and positioning accuracy. Therefore, before starting an operation of the industrial robot, it is necessary to perform adjustment work for absorbing the individual difference in speed reducers. This adjustment work is a burden on the operator.

This problem may occur not only with the industrial robot but also with any master machine in which a speed reducer is incorporated, such as a machine tool, for example.

It is desirable to provide a technology capable of reducing a load of an adjustment work of a master machine for absorbing the individual difference in speed reducers.

In addition, aspects of the present invention include arbitrary combinations of the above-described elements and mutual substitution of elements or expressions of the present invention among apparatuses, methods, systems, or the like.

According to the present invention, it is possible to reduce the load of the adjustment work of the master machine for absorbing the individual difference in speed reducers.

Hereinafter, the same or equivalent constituent elements, members, and processes shown in the drawings are assigned the same reference numerals, and repeated descriptions thereof will be appropriately omitted. In addition, dimensions of members in each drawing are shown appropriately enlarged or reduced for easy understanding. In each drawing, a portion of members which are not important in describing an embodiment is omitted.

First Embodiment

FIG. 1 is a schematic view showing a configuration of an industrial machine supporting system 2 according to a first embodiment. An industrial machine supporting system 2 includes a measurement device 100 and a server 200 managed by a speed reducer maker, and an industrial machine 300 and an information processing terminal 400 held by a customer company A, a customer company B, etc.

The speed reducer maker is a company which manufactures a speed reducer. The speed reducer maker measures the performance data of each manufactured speed reducer using the measurement device 100. The measurement device 100 transmits the measured performance data of each speed reducer to the server 200 together with a speed reducer ID which is information for uniquely identifying the speed reducer. In the present embodiment, the measurement device 100 measures an angle transmission error, a spring constant, a lost motion, and a hysteresis loss (backlash) as the performance data.

The server 200 holds the performance data of each speed reducer transmitted from the measurement device 100. The speed reducer maker determines whether or not each speed reducer can be shipped based on the performance data of each speed reducer held in the server 200, and ships a speed reducer determined to be shipped. Further, in the present embodiment, the speed reducer maker provides the performance data of each speed reducer held in the server 200 in response to a request from a customer company.

Each customer company is a user of the speed reducer manufactured by the speed reducer maker. A customer company may be an industrial machine maker which, through a purchase or the like, obtains the speed reducer manufactured by the speed reducer maker and incorporates the obtained speed reducer in the industrial machine 300 to manufacture the industrial machine 300, or a company that purchases and uses the industrial machine 300 from the industrial machine maker. The industrial machine 300 is an industrial robot, a machine tool, or the like. Only one industrial machine 300 is shown in FIG. 1 for each customer company. However, generally, in most cases, each customer company holds a plurality of industrial machines 300. Hereinafter, the industrial machine 300 held by customer company A will be described as a representative of the industrial machine 300.

The industrial machine 300 includes motors 310a, 310b, 310c, etc., generically referred to as a motor 310, speed reducers 10a, 10b, 10c, etc., generically referred to as the speed reducer 10, and a control device 330. For example, if the industrial machine 300 is an industrial robot having a plurality of joints, a pair of motors 310 and a speed reducer 10 are disposed corresponding to each of the plurality of joints.

The speed reducer 10 is a speed reducer manufactured by the speed reducer maker. The speed reducers 10a, 10b, 10c, etc., decelerate and output rotations of the motors 310a, 310b, 310c, etc., respectively.

Identification information 20 indicating the speed reducer ID is attached to the speed reducer 10. The identify information 20 is information expressed by encoding the speed reducer ID into a one-dimensional code or a two-dimensional code. In the present embodiment, the identification information 20 is printed directly on the speed reducer 10. For example, the identification information 20 may be attached to the measurement device 100.

The control device 330 controls an operation of the industrial machine 300. Particularly, the control device 330 controls the rotation of the motor 310 based on the performance data of the speed reducer 10 transmitted from the information processing terminal 400 as described later.

The information processing terminal 400 is an information processing terminal with a camera function, and is a smartphone or a tablet terminal, for example. The information processing terminal 400 images the identification information 20 with a camera, and acquires the speed reducer ID from the imaged identification information 20. The information processing terminal 400 transmits a performance data transmission request including the speed reducer ID read in this manner to the server 200. The information processing terminal 400 receives the performance data transmitted from the server 200 in response to the performance data transmission request, and transmits the performance data to the industrial machine 300.

Figure 2:
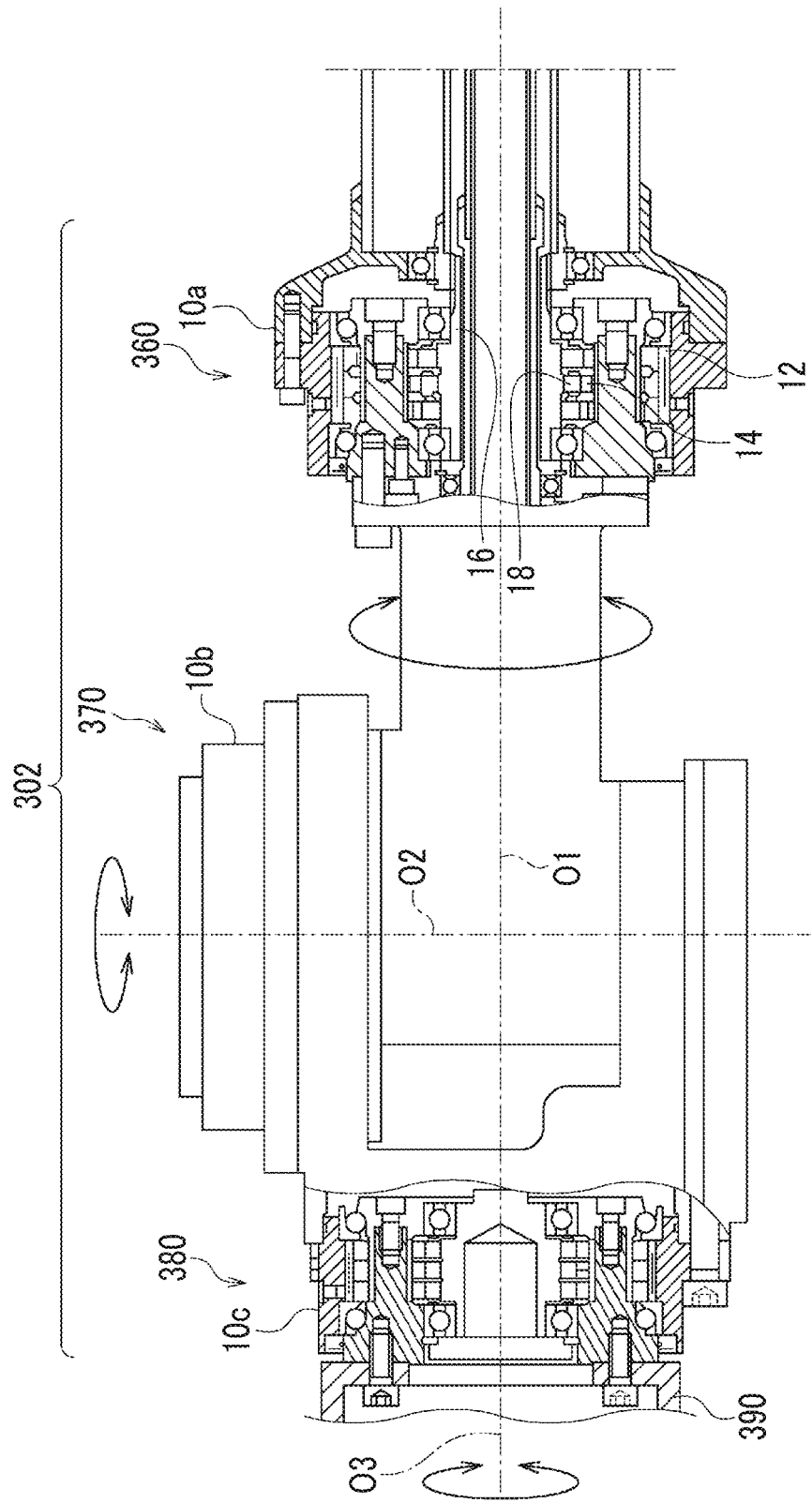
FIG. 2 is a sectional view of a wrist portion of the industrial machine of FIG. 1.

FIG. 2 is a sectional view of a wrist portion 302 of an industrial robot which is an example of the industrial machine 300. The wrist portion 302 is a portion after a fourth axis among a plurality of axes provided in the robot. More specifically, the wrist portion 302 is a portion after an arm portion of the robot constituted by basic three axes of turning, front, rear, upper, and lower.

The wrist portion 302 includes three joints 360, 370, and 380, and an attachment 390 attached to the joint 380. The joints 360, 370, 380 are arranged in this order from the arm portion side. The speed reducer 10a, the speed reducer 10b, and the speed reducer 10c are incorporated in the joints 360, 370, and 380, respectively.

The joint 360 is rotatable about an axis O1, the joint 370 is rotatable about an axis O2 orthogonal to the axis O1, and the joint 380 is rotatable about an axis O3 orthogonal to the axis O2. A cooperative rotation of the joints 360, 370, and 380 enables three-dimensional control of the attachment 390.

The speed reducer 10a will be described as a representative of the speed reducer 10. The speed reducer 10b and the speed reducer 10c are configured similarly the speed reducer 10a. The speed reducer 10a according to the present embodiment is an eccentrically oscillating type speed reducer. The speed reducer 10a includes an internal gear 12, an external gear 14 which has a number of teeth slightly smaller (for example, about 1 to 5 less) than that of the internal gear 12 and internally meshes with the internal gear 12 while oscillating, an input shaft 16 which is connected to a motor (not shown) and rotates about the axis O1, and an eccentric body 18 which is integrally formed with the input shaft 16 and oscillates the external gear 14. A rotation of one of the internal gear 12 and the external gear 14 is constrained, and a relative rotation between the internal gear 12 and the external gear 14 from the other of the internal gear 12 and the external gear 14 is taken as an output.

The speed reducer maker measures, for the speed reducer, the angle transmission error, the spring constant, the lost motion, and the hysteresis loss by the measurement device 100 before shipping the speed reducer 10. Here, the "angle transmission error" is a difference between a theoretical output rotation angle and an actual output rotation angle when a rotation angle is given to the input under no load conditions, the "spring constant" is a slope of a straight line connecting two points, a point of rated torque×50% and a point of rated torque, on a hysteresis curve (described later), the "lost motion" is a twist angle (a sum of an absolute value of a twist angle at the time of rated torque+3% and an absolute value of a twist angle at the time of rated torque−3%) at the time of rated torque×±3% load, and the "hysteresis loss" is a difference between twist angles on a torsion side and a return side when a load torque is zero.

Figure 3:
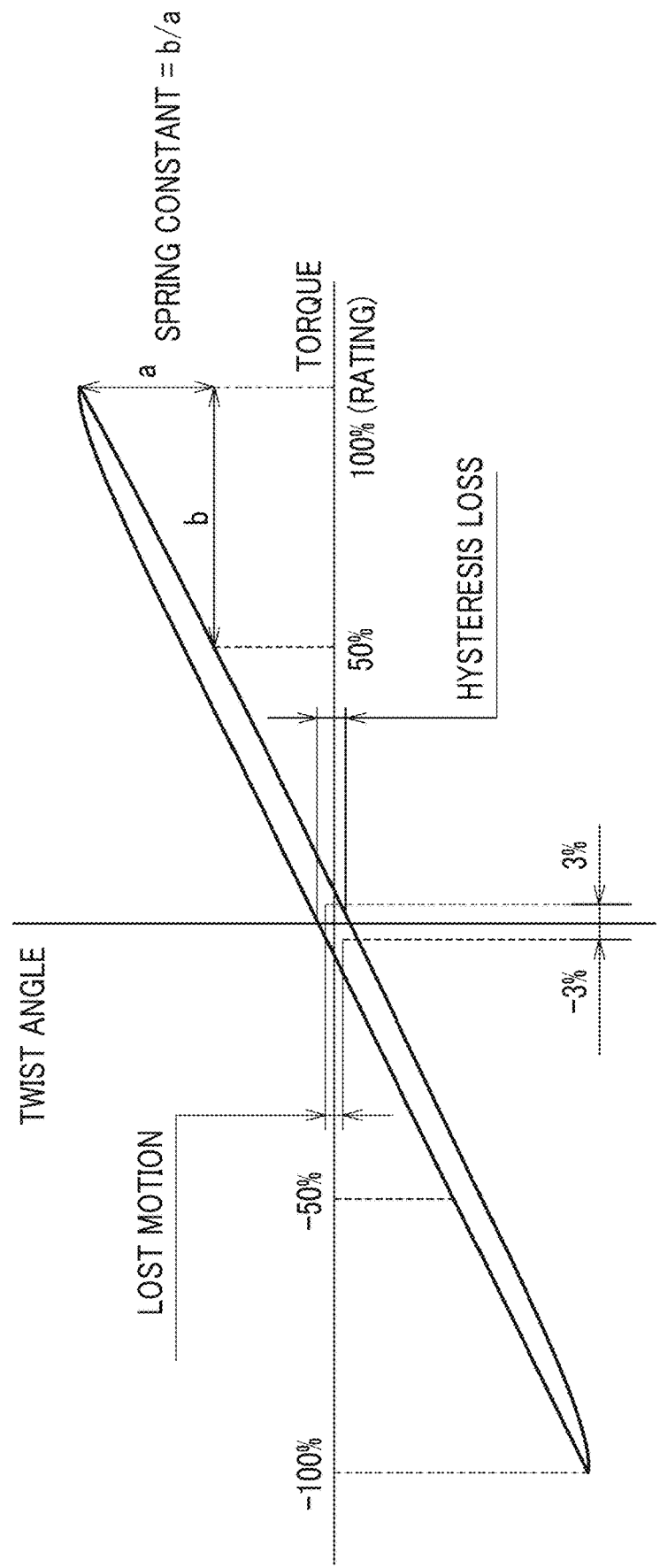
FIG. 3 is a graph showing an example of a hysteresis curve.

The "hysteresis curve" is a curve showing a relationship between a load and a twist angle of an output shaft when an input shaft is fixed, torque is applied to the output shaft slowly to the rating, and then the torque is removed. FIG. 3 shows an example of the hysteresis curve. In FIG. 3, a horizontal axis is the torque and a vertical axis is the twist angle.

Figure 4:
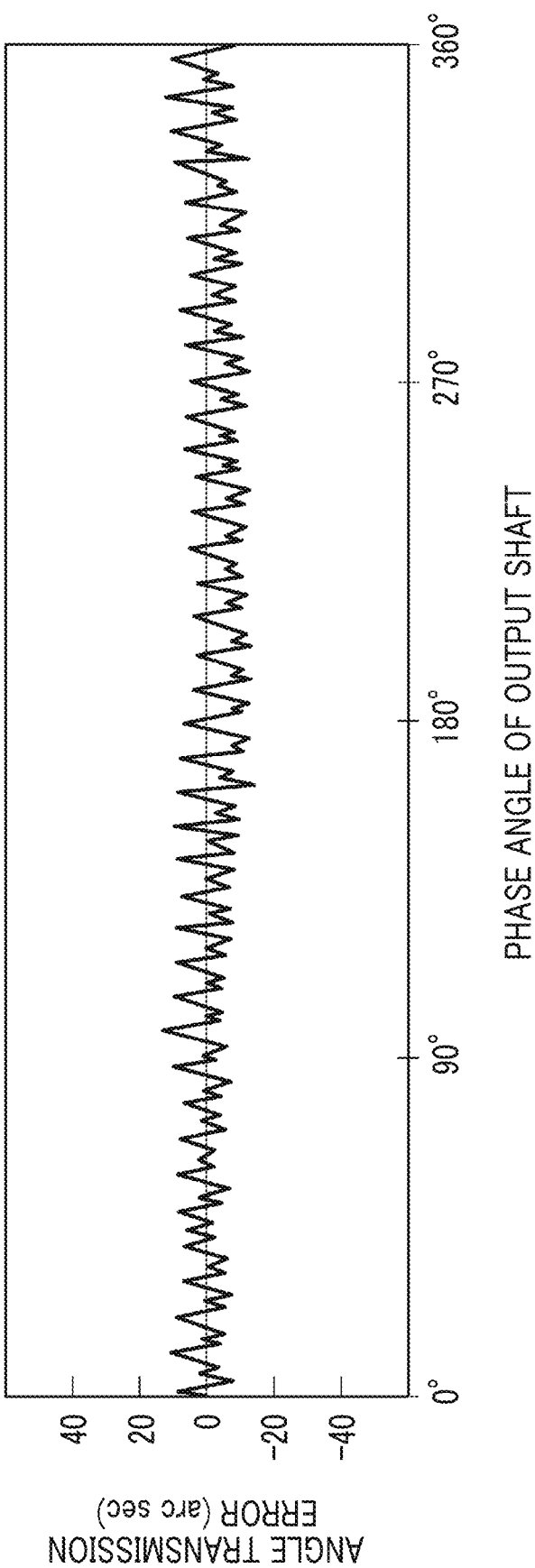
FIG. 4 is a graph showing an example of performance data.
Figure 5:
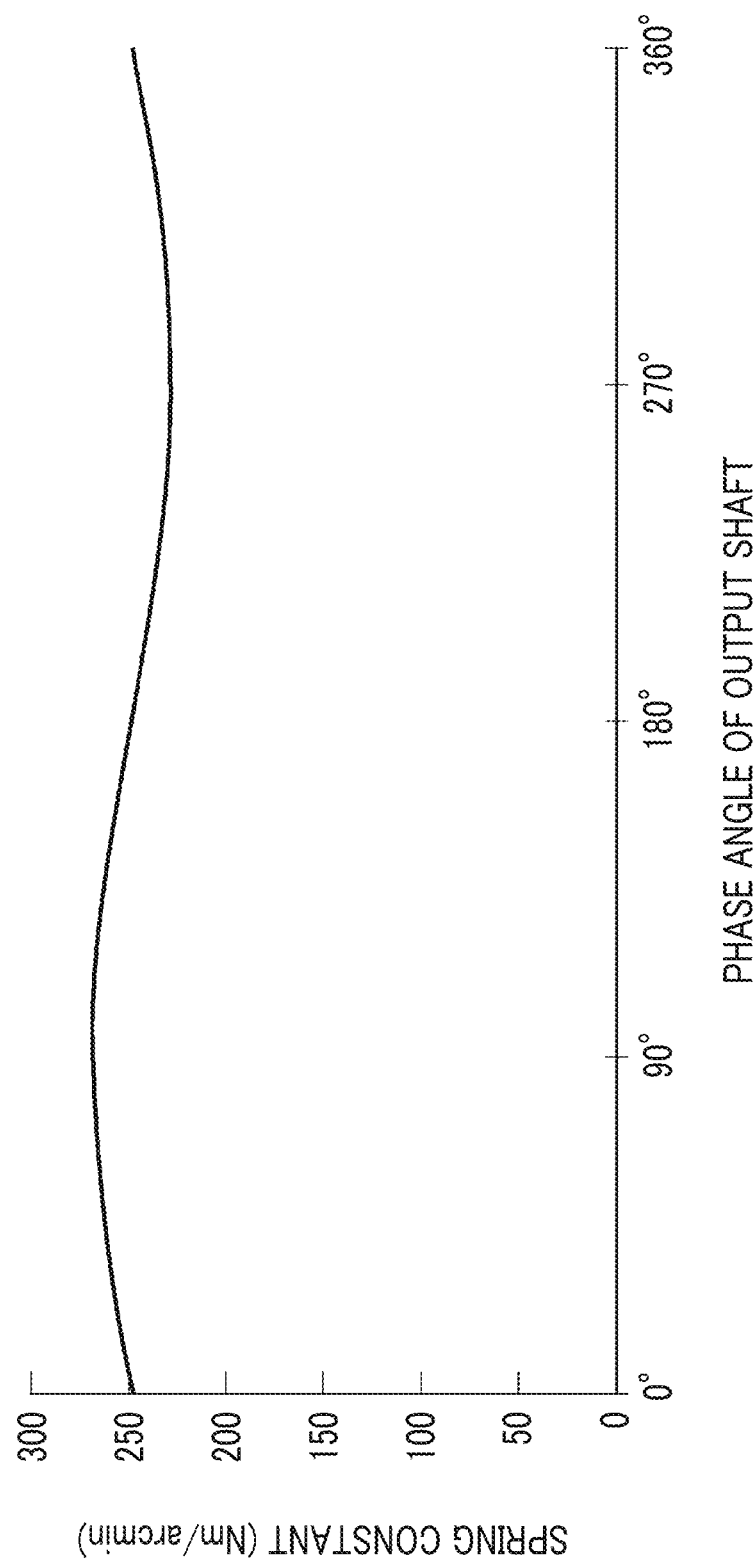
FIG. 5 is a graph showing an example of the performance data.

FIGS. 4 and 5 each show an example of the performance data measured by the measurement device 100. FIG. 4 is a graph of the angle transmission error, and FIG. 5 is a graph of the spring constant. In FIGS. 4 and 5, a horizontal axis is a phase angle of the output shaft, and vertical axes are the angle transmission error and the spring constant, respectively.

As shown in FIGS. 4 and 5, the angle transmission error and the spring constant are data which are changed according to the phase angle of the output shaft. Although not shown, the lost motion and hysteresis loss are also data which are changed according to the phase angle of the output shaft.

Figure 6:
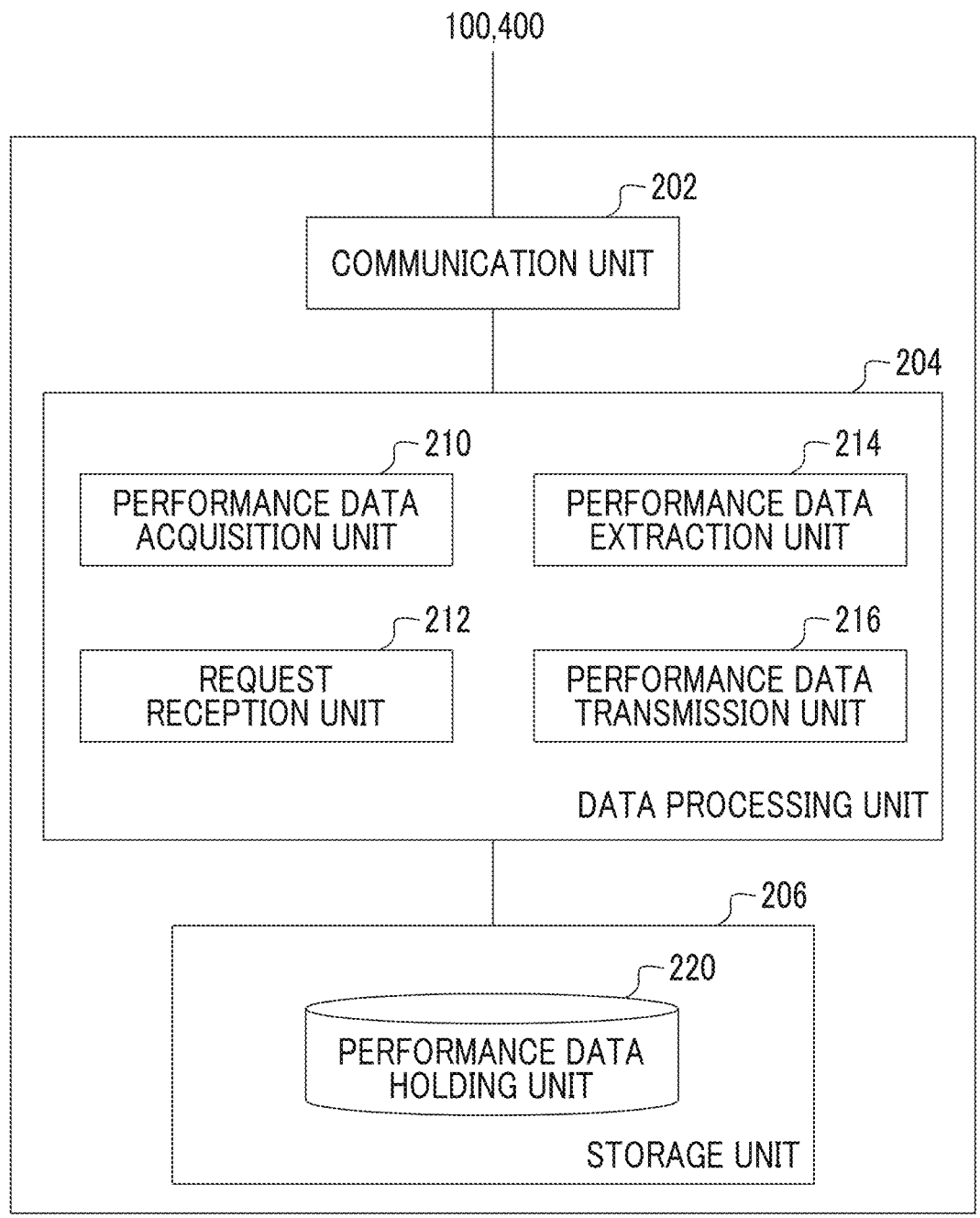
FIG. 6 is a block diagram showing a function and configuration of a server of FIG. 1.

FIG. 6 is a block diagram showing a function and configuration of the server 200. Each block shown here can be realized by hardware as an element such as a (Central Processing Unit) CPU of a computer or a mechanical device and by software as a computer program or the like. However, here, each block depicts a function block realized by cooperation. Therefore, it is understood by a person skilled in the art who has mentioned the present specification that the function blocks can be realized in various forms by a combination of hardware and software. The same applies to the subsequent block diagrams.

The server 200 includes a communication unit 202, a data processing unit 204, and a storage unit 206.

The communication unit 202 executes communication processing with the measurement device 100 and the information processing terminal 400 according to various communication protocols. For example, the data processing unit 204 sends or receives data with respect to the measurement device 100 or the information processing terminal 400 via the communication unit 202.

The storage unit 206 includes a performance data holding unit 220 that holds performance data.

The data processing unit 204 executes various data processing based on the data acquired from the communication unit 202. The data processing unit 204 includes a performance data acquisition unit 210, a request reception unit 212, a performance data extraction unit 214, and a performance data transmission unit 216.

The performance data acquisition unit 210 acquires the speed reducer ID and the performance data transmitted from the measurement device 100. The performance data acquisition unit 210 records the speed reducer ID and the performance data in the performance data holding unit 220 in association with each other.

The request reception unit 212 receives the performance data transmission request from the information processing terminal 400.

The performance data extraction unit 214 extracts performance data corresponding to the speed reducer ID included in the performance data transmission request accepted by the request reception unit 212 from the performance data holding unit 220.

The performance data transmission unit 216 transmits the performance data extracted by the performance data extraction unit 214 to the information processing terminal 400 of the request source together with the corresponding speed reducer ID.

Figure 7:
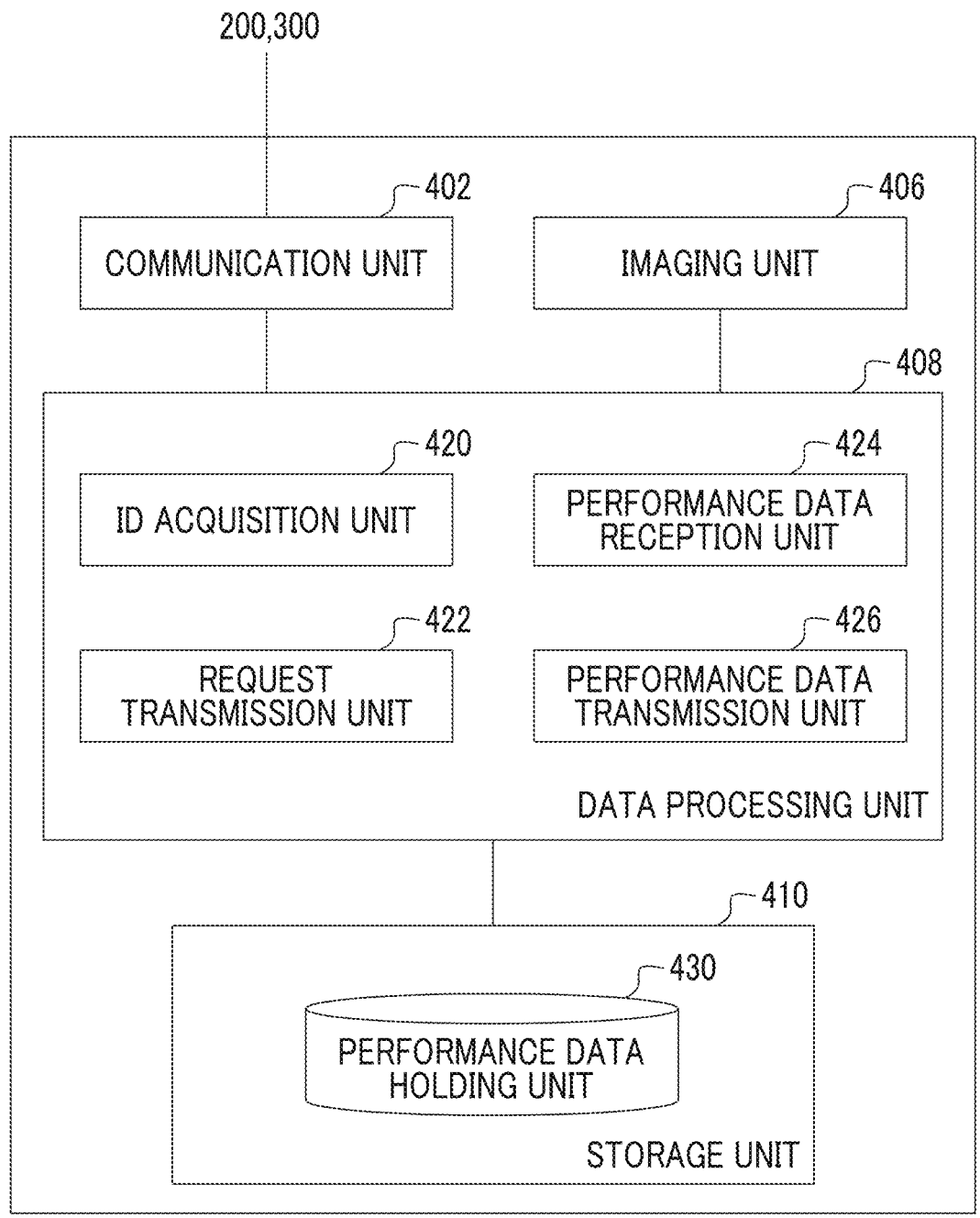
FIG. 7 is a block diagram showing a function and configuration of an information processing terminal of FIG. 1.

FIG. 7 is a block diagram showing the function and configuration of the information processing terminal 400. The information processing terminal 400 includes a communication unit 402, an imaging unit 406, a data processing unit 408, and a storage unit 410.

The communication unit 402 communicates with the server 200 and the industrial machine 300 according to various protocols. For example, the data processing unit 408 sends or receives data with respect to the server 200 and the industrial machine 300 via the communication unit 402.

The imaging unit 406 is a camera mounted in a housing of the information processing terminal 400. The user causes the imaging unit 406 to image the identification information 20 of the speed reducer 10.

The storage unit 410 includes a performance data holding unit 430 which holds the performance data.

The data processing unit 408 executes various data processing based on the data acquired from the communication unit 402 and the imaging unit 406. The data processing unit 408 includes an ID acquisition unit 420, a request transmission unit 422, a performance data reception unit 424, and a performance data transmission unit 426.

The ID acquisition unit 420 reads identification information 20 from the image imaged by the imaging unit 406, decodes the read identification information 20, and acquires the speed reducer ID.

The request transmission unit 422 transmits the performance data transmission request including the speed reducer ID acquired by the ID acquisition unit 420 to the server 200.

The performance data reception unit 424 receives the speed reducer ID and the performance data transmitted from the server 200 in response to the performance data transmission request. The performance data reception unit 424 records the received speed reducer ID and the performance data in the performance data holding unit 430 in association with each other.

The performance data transmission unit 426 transmits the performance data held in the performance data holding unit 430 to the industrial machine 300 together with the corresponding speed reducer ID.

Figure 8:
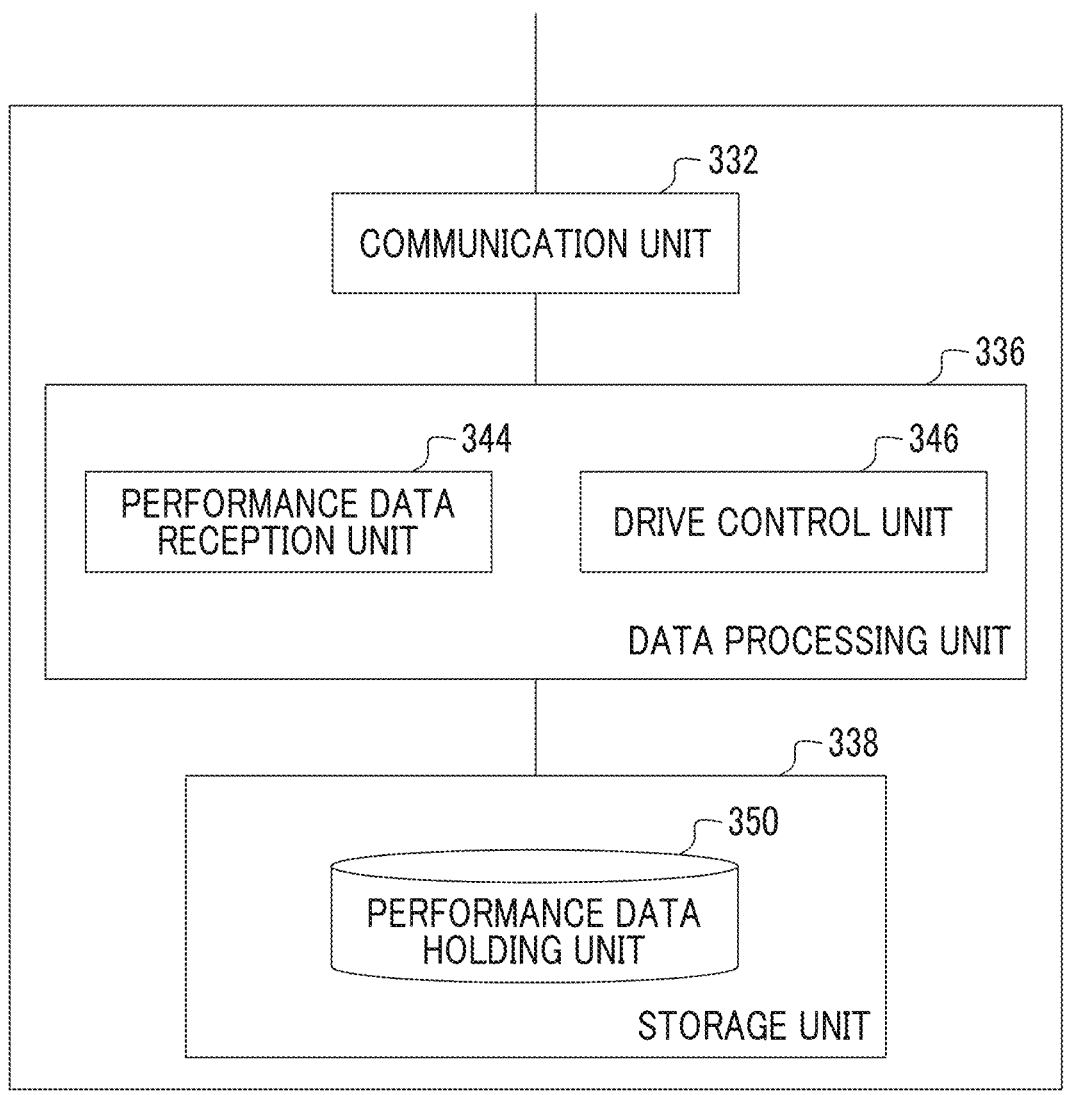
FIG. 8 is a block diagram showing a function and configuration of a control device for the industrial machine of FIG. 1.

FIG. 8 is a block diagram showing a function and configuration of the control device 330 for the industrial machine 300. The control device 330 includes a communication unit 332, a data processing unit 336, and a storage unit 338.

The communication unit 332 executes communication processing with the information processing terminal 400 according various protocols. For example, the data processing unit 336 sends or receives data with respect to the information processing terminal 400 via the communication unit 332.

The storage unit 338 includes a performance data holding unit 350 which holds the performance data.

The data processing unit 336 executes various data processing based on the data acquired from the communication unit 332. The data processing unit 336 includes a performance data reception unit 344 and a drive control unit 346.

The performance data reception unit 344 receives the speed reducer ID and the performance data transmitted from the information processing terminal 400. The performance data reception unit 344 records the received speed reducer ID and the performance data in the performance data holding unit 350 in association with each other. In addition, in a case where the industrial machine 300 has a plurality of speed reducers 10, the performance data holding unit 350 records a portion ID (for example, a joint number in a case of an industrial robot) capable of specifying an installation portion of the speed reducer 10 and a motor ID capable of identifying the speed reducer ID of the speed reducer 10 incorporated in the installation portion, the performance, and the connected motor 310 in association with each other. The association between the portion ID, the speed reducer ID, and the motor ID may be input to the information processing terminal 400 and transmitted to the industrial machine 300, or may be input using an input device provided in the industrial machine 300 itself.

The drive control unit 346 controls each motor 310 based on the performance data of each speed reducer 10 held in the performance data holding unit 350. For example, if the motor 310a is specifically described as an example, the drive control unit 346 controls the motor 310a based on the performance data of the speed reducer 10a. In particular, the drive control unit 346 controls the motor 310a using a value of performance data corresponding to a phase angle of the speed reducer 10a as an input value. In addition, in a case where an operation of another speed reducer affects an operation of the speed reducer 10a, the drive control unit 346 may control the motor 310 based on the performance data of another speed reducer affecting the speed reducer 10a in addition to the performance data of the speed reducer 10a. Specifically, in a case where an operation of the speed reducer 10b affects the operation of the speed reducer 10a, the drive control unit 346 may control the motor 310a based on the performance data of the speed reducer 10b in addition to the performance data of the speed reducer 10a.

An operation of the industrial machine supporting system 2 having the above-described configuration will be described. The information processing terminal 400 reads the speed reducer ID of the speed reducer 10 which is to be incorporated in the industrial machine 300 or is incorporated in the industrial machine 300. The information processing terminal 400 transmits the performance data transmission request including the read speed reducer ID to the server 200. If the server 200 receives the performance data transmission request, the server 200 extracts the performance data corresponding to the speed reducer ID included in the performance data transmission request from the storage unit 206, and transmits the extracted performance data to the information processing terminal 400 together with the speed reducer ID. The information processing terminal 400 receives the performance data transmitted in response to the performance data transmission request, and transmits the received performance data to the industrial machine 300 together with the speed reducer ID. The control device 330 of the industrial machine 300 receives the performance data transmitted from the information processing terminal 400, stores the received performance data and the speed reducer ID in association with the portion ID and the motor ID, and controls operation of the industrial machine 300 based on the stored performance data.

Effects of the industrial machine supporting system 2 configured as described above will be described. In general, the speed reducer 10 greatly affects trajectory accuracy of the industrial machine 300. Meanwhile, performance of the speed reducer 10 differs for each individual speed reducer and each phase angle. Therefore, in the related art, a special control program based on a special control theory is created so as to absorb a performance difference between individual speed reducers and a performance difference between phase angles, and a parameter related to the control program is adjusted for each attitude in a movement of the industrial machine 300, that is, for each phase angle of the speed reducer. This operation places a heavy burden on the customer company which manufactures or holds the industrial machine 300. In addition, the customer company which manufactures or holds the industrial machine 300 also needs know-how to create the special control program and know-how to adjust the parameter related to the control program.

Meanwhile, according to the industrial machine supporting system 2 of the present embodiment, the performance data of the speed reducer 10 for each individual and each phase angle is provided to a customer company which manufactures or holds the industrial machine 300. With the performance data corresponding to the phase angle of the speed reducer 10 as the input value, a control program (for example, a control program corresponding to the above-described drive control unit) may be created to control in accordance with the input value. That is, according to the present embodiment, it is not necessary to adjust the special control program and the parameter related to the control program, and the burden on the customer company which manufactures or holds the industrial machine 300 is reduced. In addition, since there is no need for know-how to create the special control program or know-how to adjust the parameter related to the control program, it is possible to manufacture and use the industrial machine 300 even for a customer company which does not have the know-how.

In addition, according to the industrial machine supporting system 2 of the present embodiment, for example, in the case where the operation of the speed reducer 10b affects the operation of the speed reducer 10a for decelerating and outputting the rotation of the motor 310a, the motor 310a is controlled based on the performance data of the speed reducer 10b in addition to the performance data of the speed reducer 10a. Accordingly, it possible to increase the trajectory accuracy of the industrial machine 300.

Second Embodiment

For example, the speed reducer deteriorates over time with use if wear of a meshing portion progresses. In a second embodiment, in response to a request from the customer company, updated performance data (hereinafter referred to as "update performance data") in consideration of the aged deterioration is provided. Hereinafter, differences from the first embodiment will be mainly described.

Figure 9:
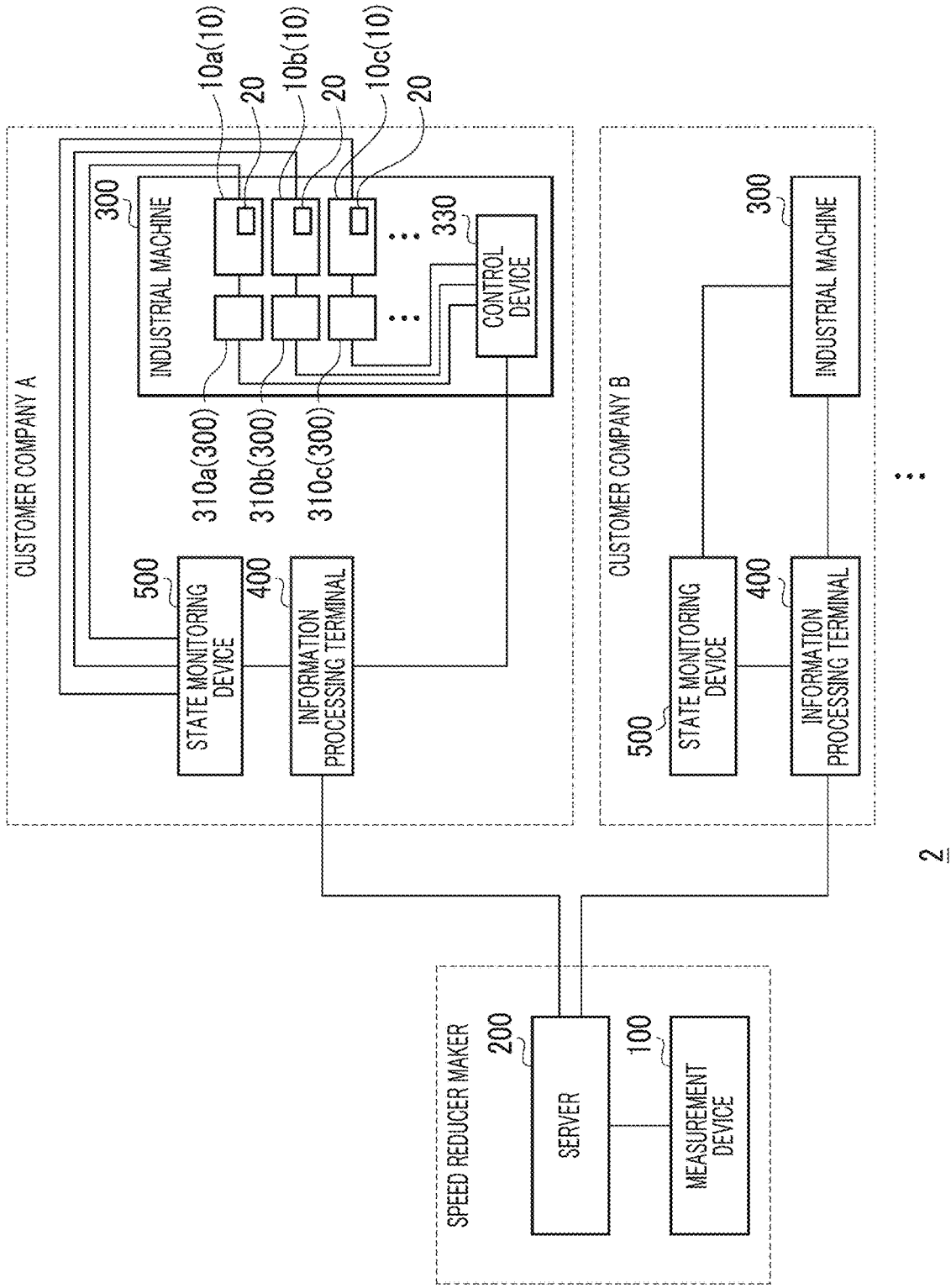
FIG. 9 is a schematic view showing a configuration of an industrial machine supporting system according to a second embodiment.

FIG. 9 is a schematic view showing a configuration of an industrial machine supporting system 2 according to the second embodiment. FIG. 9 corresponds to FIG. 1. The industrial machine supporting system 2 according to the present embodiment further includes state monitoring devices 500 which are held by the customer company A, the customer company B, . . . , respectively. The state monitoring device 500 is a device that measures deterioration related information that is information for specifying the deterioration state of the speed reducer 10. In the present embodiment, the state monitoring device 500 measures iron powder concentration in a lubricator of the speed reducer 10 as deterioration related information. The iron powder concentration in the lubricant increases with the use of the speed reducer 10. The customer company transmits a performance data update request including the speed reducer ID and the deterioration related information of the speed reducer 10 of the speed reducer ID from the information processing terminal 400 to the server 200. The speed reducer maker generates the update performance data by updating (correcting) the performance data held in the server 200 in response to a request from the customer company, that is, the information processing terminal 400, in consideration of the aged deterioration, and provides the update performance data.

Subsequently, configurations of the server 200, the information processing terminal 400 and the industrial machine 300 will be specifically described.

Figure 10:
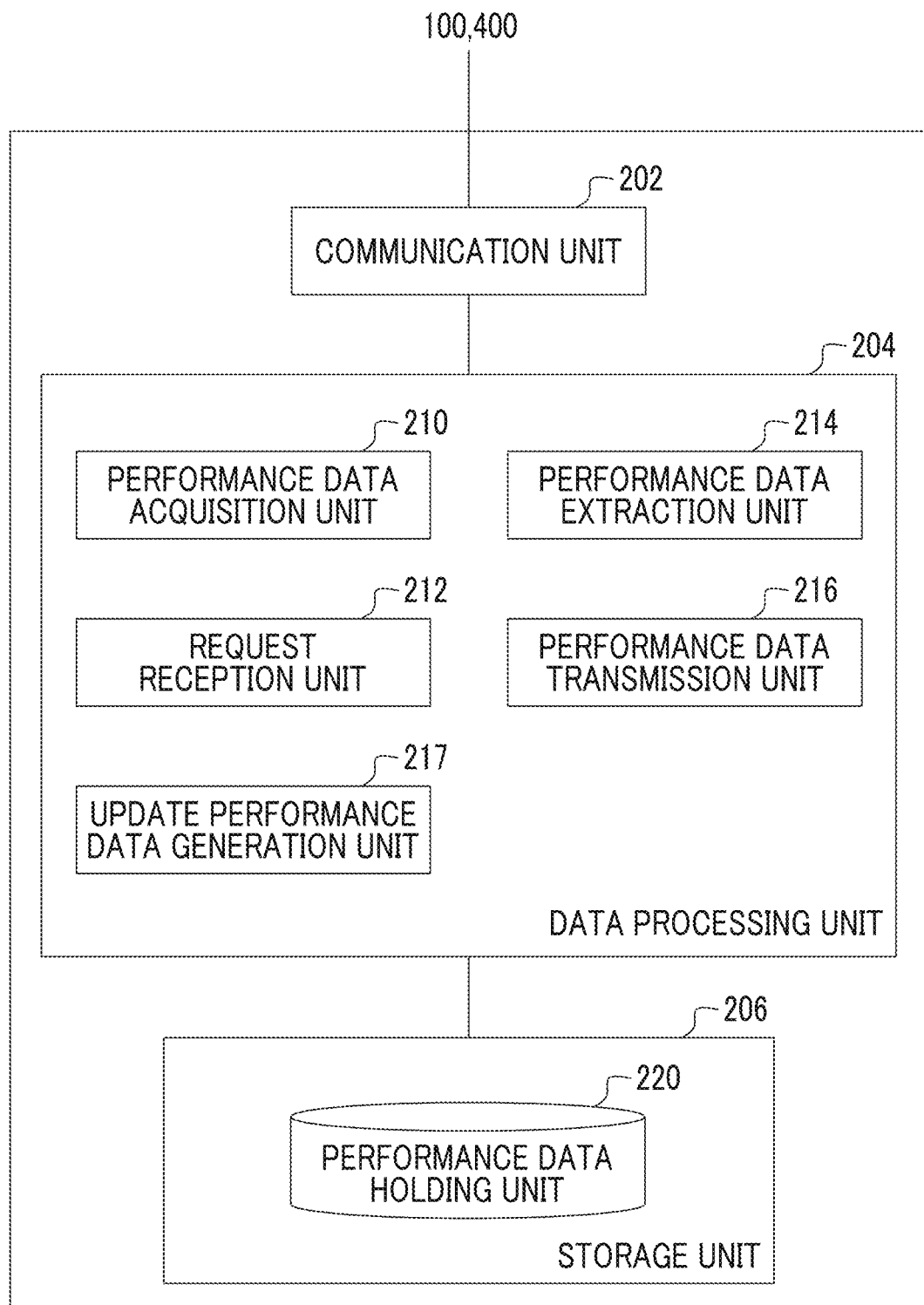
FIG. 10 is a block diagram showing a function and configuration of a server of FIG. 9.

FIG. 10 is a block diagram showing the function and configuration of the server 200. FIG. 10 corresponds to FIG. 6. In the present embodiment, the data processing unit 204 of the server 200 further includes an update performance data generation unit 217. Moreover, the request reception unit 212 and the performance data transmission unit 216 also have the following functions, in addition to the functions described in the first embodiment.

The request reception unit 212 receives the performance data update request from the information processing terminal 400.

The update performance data generation unit 217 extracts, from the performance data holding unit 220, performance data corresponding to the speed reducer ID included in the performance data update request received by the request reception unit 212. Subsequently, the update performance data generation unit 217 generates the update performance data which is performance data updated (corrected) in consideration of the aged deterioration, based on the extracted performance data and the deterioration related information included in the performance data update request.

Figure 11:
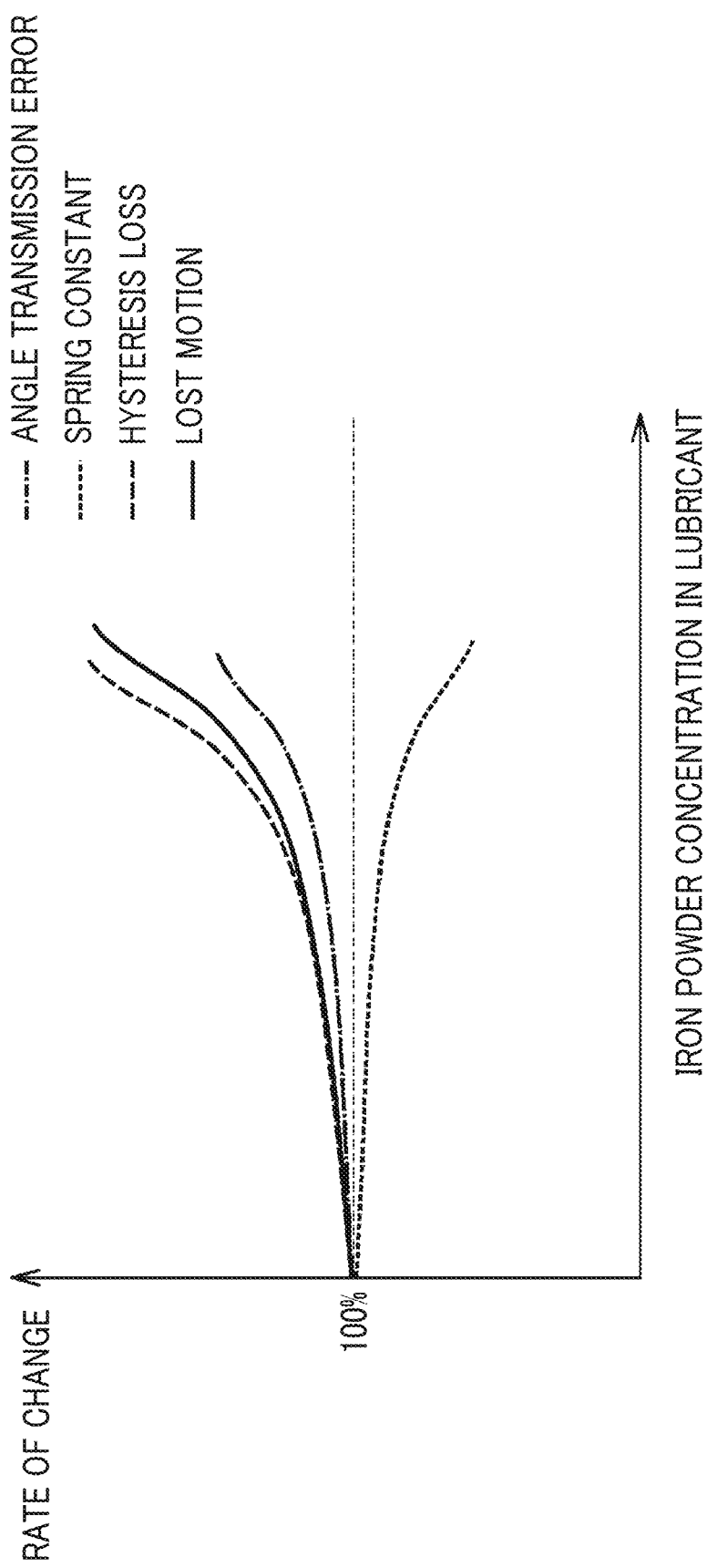
FIG. 11 is a graph showing a relationship between an iron powder concentration in a lubricant of a speed reducer and a rate of change of a value of each performance data.

Specifically, for example, the update performance data is generated as follows. For the angle transmission error, spring constant, lost motion, and hysteresis loss, as shown in FIG. 11, a respective relation between the iron powder concentration in the lubricant and the rate of change of each performance data value is specified beforehand by experiments or the like. The update performance data generation unit 217 generates updated angle transmission error, spring constant, lost motion, and hysteresis loss by multiplying each of the angle transmission error, spring constant, lost motion, and hysteresis loss extracted from the performance data holding unit 220 by the rate of change corresponding to the iron powder concentration indicated by the deterioration related information.

The performance data transmission unit 216 transmits the update performance data generated by the update performance data generation unit 217 to the information processing terminal 400 of the request source together with the corresponding speed reducer ID.

The information processing terminal 400 has the same function block as that of FIG. 7. Each of the request transmission unit 422, the performance data reception unit 424, and the performance data transmission unit 426 has the following functions, in addition to the function described in the first embodiment.

The request transmission unit 422 acquires, from the state monitoring device 500, the determination related information on the speed reducer 10 of the speed reducer ID acquired by the ID acquisition unit 420. In addition, the request transmission unit 422 transmits the performance data update request including the speed reducer ID and the deterioration related information to the server 200.

The performance data reception unit 424 receives the speed reducer ID and the update performance data transmitted from the server 200 in response to the performance data update request. The performance data reception unit 424 records the received speed reducer ID and the update performance data in the performance data holding unit 430 in association with each other.

The performance data transmission unit 426 transmits the update performance data held in the performance data holding unit 430 to the industrial machine 300 together with the corresponding speed reducer ID.

The industrial machine 300 has the same function block as that of FIG. 8. The performance data reception unit 344 also has the following functions, in addition to the functions described in the first embodiment.

The performance data reception unit 344 receives the speed reducer ID and the update performance data transmitted from the information processing terminal 400. The performance data reception unit 344 overwrites and records the update performance data received as performance data of the received speed reducer ID in the performance data holding unit 350. Accordingly, thereafter, the drive control unit 346 controls each motor 310 based on the update performance data.

An operation of the industrial machine supporting system 2 having the above-described configuration will be described. Here, an operation regarding a provision of the update performance data will be described. The information processing terminal 400 reads the speed reducer ID of the speed reducer 10 incorporated in the industrial machine 300. The information processing terminal 400 acquires the deterioration related information about the speed reducer 10 of the read speed reducer ID from the state monitoring device 500. For example, the information processing terminal 400 transmits the read speed reducer ID to the state monitoring device 500, and acquires the deterioration related information corresponding to the speed reducer ID from the state monitoring device 500. The information processing terminal 400 transmits the performance data update request including the read speed reducer ID and the determination related information acquired from the state monitoring device 500 to the server 200. If the server 200 receives the performance data update request, the server 200 extracts the performance data corresponding to the speed reducer ID included in the performance data update request from the storage unit 206, and generates the update performance data based on the extracted performance data and the deterioration related information included in the performance data update request. The server 200 transmits the update performance data to the information processing terminal 400 of the request source together with the speed reducer ID. The information processing terminal 400 receives the update performance data transmitted in response to the performance data update request, and transmits the received update performance data to the industrial machine 300 together with the speed reducer ID. The control device 330 of the industrial machine 300 receives the update performance data transmitted from the information processing terminal 400, stores the received update performance data and the speed reducer ID in association with the portion ID and the motor ID, and controls the operation of the industrial machine 300 based on the stored update performance data.

According to the industrial machine supporting system 2 configured as described above, in a case where the speed reducer 10 aged-deteriorates, the performance data can be updated in consideration of the aged deterioration, and the industrial machine 300 can be controlled based on the update performance data. Therefore, it is possible to reduce the deterioration of controllability due to the aged deterioration of the speed reducer 10.

Third Embodiment

In the first and second embodiments, the case is described, in which the performance data or the update performance data for the speed reducer held by the customer company is provided in response to the request from the customer company. In a third embodiment, a case is described, in which a control program for controlling the industrial machine held by the customer company is customized and provided based on the performance data of the speed reducer incorporated in the industrial machine. Hereinafter, differences from the second embodiment will be mainly described.

The industrial machine supporting system 2 according to the third embodiment is configured similarly to FIG. 9. In a case where the customer company requests the control program, a control program transmission request including the speed reducer ID is transmitted to the server 200 from the information processing terminal 400. In addition, in a case where the customer company requests an update control program considering the aged deterioration of the speed reducer 10 incorporated in the industrial machine 300, the performance data update request including the speed reducer ID and the deterioration related information of the speed reducer 10 of the speed reducer ID is transmitted to the server 200 from the information processing terminal 400. The speed reducer maker generates the update control program in consideration of the control program or the aged deterioration in response to a request from the customer company, that is, the information processing terminal 400, and provides the update control program.

Figure 12:
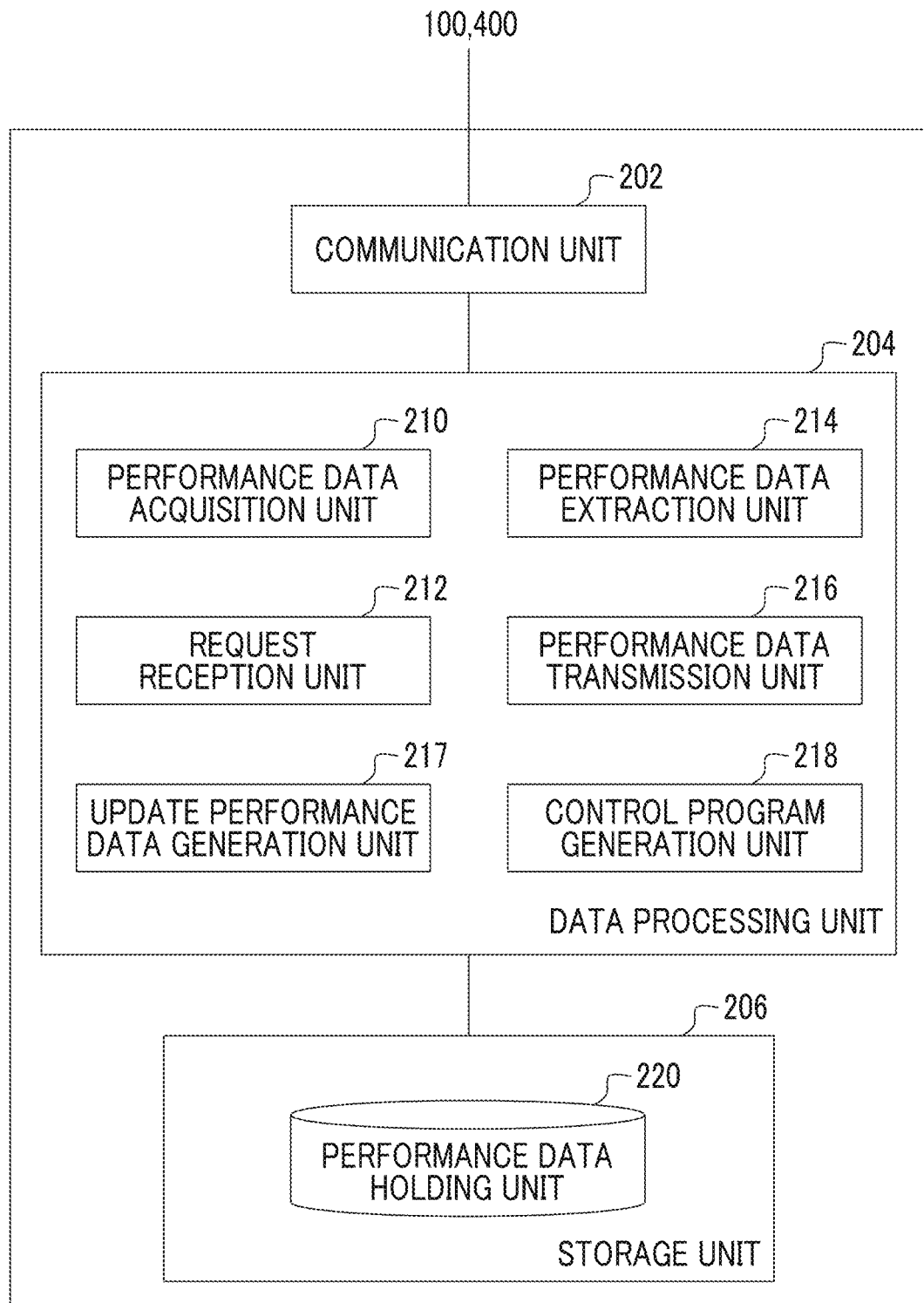
FIG. 12 is a block diagram showing a function and configuration of a server of an industrial machine supporting system according to a third embodiment.

FIG. 12 is a block diagram showing the function and configuration of the server 200. FIG. 12 corresponds to FIG. 6. In the present embodiment, the data processing unit 204 of the server 200 further includes a control program generation unit 218. Moreover, the request reception unit 212 and the performance data transmission unit 216 also have the following functions, in addition to the functions described in the first and second embodiments.

The request reception unit 212 receives the control program transmission request from the information processing terminal 400. Further, the request reception unit 212 receives a control program update request from the information processing terminal 400.

If the request reception unit 212 receives the control program transmission request, the control program generation unit 218 extracts the performance data corresponding to the speed reducer ID included in the control program transmission request, from the performance data holding unit 220. Then, the control program generation unit 218 customizes a basic control program for controlling the industrial machine 300 prepared in advance, based on the extracted performance data, and generates a control program suitable for the industrial machine 300 of the request source.

In addition, if the request reception unit 212 receives the control program update request, the control program generation unit 218 provides the speed reducer ID and the deterioration related information included in the control program update request to the update performance data generation unit 217 to generate the update performance data. Then, the control program generation unit 218 customizes the basic control program based on the update performance data, and generates an update control program suitable for the industrial machine 300 of the request source.

The performance data transmission unit 216 transmits a control program generated by the control program generation unit 218 in response to the control program transmission request to the information processing terminal 400. In addition, the performance data transmission unit 216 transmits the update control program generated by the control program generation unit 218 in response to the control program update request to the information processing terminal 400. In addition, the performance data transmission unit 216 of the present embodiment may not have a function for transmitting the performance data.

The information processing terminal 400 has the same function block as that of FIG. 7. Each of the request transmission unit 422, the performance data reception unit 424, and the performance data transmission unit 426 has the following function, in addition to the functions described in the first and second embodiments.

The request transmission unit 422 transmits the control program transmission request including the speed reducer ID acquired by the ID acquisition unit 420 to the server 200. In addition, the request transmission unit 422 acquires, from the state monitoring device 500, the deterioration related information about the speed reducer 10 of the speed reducer ID acquired by the ID acquisition unit 420. Then, the request transmission unit 422 transmits the control program update request including the speed reducer ID and the determination related information to the server 200.

The performance data reception unit 424 receives the control program transmitted from the server 200 in response to the control program transmission request. The performance data transmission unit 426 transmits the control program received by the performance data reception unit 424 to the industrial machine 300. In addition, the performance data reception unit 424 receives the update control program transmitted from the server 200 in response to the control program update request. The performance data transmission unit 426 transmits the update control program received by the performance data reception unit 424 to the industrial machine 300.

The industrial machine 300 has the same function block as that of FIG. 8. The performance data reception unit 344 and the drive control unit 346 have the following functions, in addition to the functions described in the first and second embodiments.

The performance data reception unit 344 receives the control program transmitted from the server 200 in response to the control program transmission request. In addition, the performance data reception unit 344 receives the update control program transmitted from the server 200 in response to the control program update request.

The drive control unit 346 controls each motor 310 through the control program or the update control program received by the performance data reception unit 344.

An operation of the industrial machine supporting system 2 having the above-described configuration will be described. First, an operation regarding a provision of the control program will be described. The information processing terminal 400 reads the speed reducer ID of the speed reducer 10 incorporated in industrial machine 300. The information processing terminal 400 transmits the control program transmission request including the read speed reducer ID to the server 200. If the server 200 receives the control program transmission request, the server 200 extracts performance data corresponding to the speed reducer ID included in the control program transmission request from the storage unit 206, and generates a control program in which the basic control program is customized based on the extracted performance data. The server 200 transmits the control program to the information processing terminal 400 of the request source. The information processing terminal 400 receives the control program transmitted in response to the control program transmission request, and transmits the received control program to the industrial machine 300. The control device 330 of the industrial machine 300 receives the control program transmitted from the information processing terminal 400 and controls the operation of the industrial machine 300 according to the received control program.

Next, an operation regarding a provision of the update control program will be described. The information processing terminal 400 reads the speed reducer ID of the speed reducer 10 incorporated in industrial machine 300. The information processing terminal 400 acquires the deterioration related information about the speed reducer 10 of the read speed reducer ID from the state monitoring device 500. The information processing terminal 400 transmits the control program update request including the read speed reducer ID and the determination related information acquired from the state monitoring device 500, to the server 200. If the server 200 receives the control program update request, the server 200 extracts performance data corresponding to the speed reducer ID included in the control program update request from the storage unit 206, and generates the update performance data, based on the extracted performance data and the deterioration related information included in the performance data update request. Then, the server 200 generates the update control program in which the basic control program is customized based on the update performance data. The server 200 transmits the update control program to the information processing terminal 400 of the request source. The information processing terminal 400 receives the update control program transmission transmitted in response to the control program update request, and transmits the received update control program to the industrial machine 300. The control device 330 of the industrial machine 300 receives the update control program transmitted from the information processing terminal 400, and controls the operation of the industrial machine 300 according to the received update control program.

According to the industrial machine supporting system 2 configured as described above, the customer company only needs to control the operation of the industrial machine 300 by the provided control program, and a load is reduced because the customer company does not need to create the control program itself.

Further, according to the industrial machine supporting system 2, in the case where the speed reducer 10 aged-deteriorates, the control program can be updated in consideration of the aged deterioration, and the industrial machine 300 can be controlled based on the update control program. Therefore, it is possible to reduce the deterioration of controllability due to the aged deterioration of the speed reducer 10.

The industrial machine supporting systems according to the embodiments are described. It is understood by a person skilled in the art that the embodiments are examples, and that various modification examples are possible for each of the constituent elements and a combination of each processing process, and that the modification examples are within the scope of the present invention. The following shows modification examples.

Modification Example 1

In the embodiments, the case where the identification information 20 is applied to the speed reducer 10 by being printed directly on the speed reducer 10 is described. However, the present invention is not limited to this. For example, the identification information 20 may be applied to the speed reducer 10 by attaching a seal on which the identification information 20 is printed to the speed reducer 10 or engraving an outer surface of the speed reducer 10 by laser engraving or the like.

In addition, in the embodiments, the case where the identification information 20 is read by the information processing terminal 400 is described. However, the present invention is not limited to this. The identification information 20 may be read by a dedicated reader connected to the information processing terminal 400, and the identification information 20 may be taken into the information processing terminal 400. In this case, for example, the information processing terminal 400 may be an information processing terminal which does not have a camera function such as a desktop PC.

Modification Example 2

In the embodiments and the above-described modification example, the case where the identification information 20 is the information obtained by encoding the speed reducer ID into a one-dimensional code or a two-dimensional code is described. However, the invention is not limited to this, and the identification information 20 may be a speed reducer ID itself which is not encoded into a one-dimensional code or a two-dimensional code.

In this case, a person in charge can visually confirm the speed reducer ID and input the speed reducer ID into the information processing terminal 400.

Moreover, in this case, it is also possible to attach an RFID tag in which identification information 20 is written to the speed reducer 10, read the identification information 20 from the RFID tag by an RFID reader connected to the information processing terminal 400, and take the identification information 20 into the information processing terminal 400.

Modification Example 3

In the embodiments and the above-described modification examples, the case where the identification information 20 is attached to the speed reducer 10 is described. However, the present invention is not limited to this. The identification information 20 may be attached to a document such as a manual of the speed reducer 10 or an accompanying matter of the speed reducer 10 such as a packing box of the speed reducer 10, instead of the speed reducer 10 or in addition to the speed reducer 10.

Modification Example 4

Figure 13:
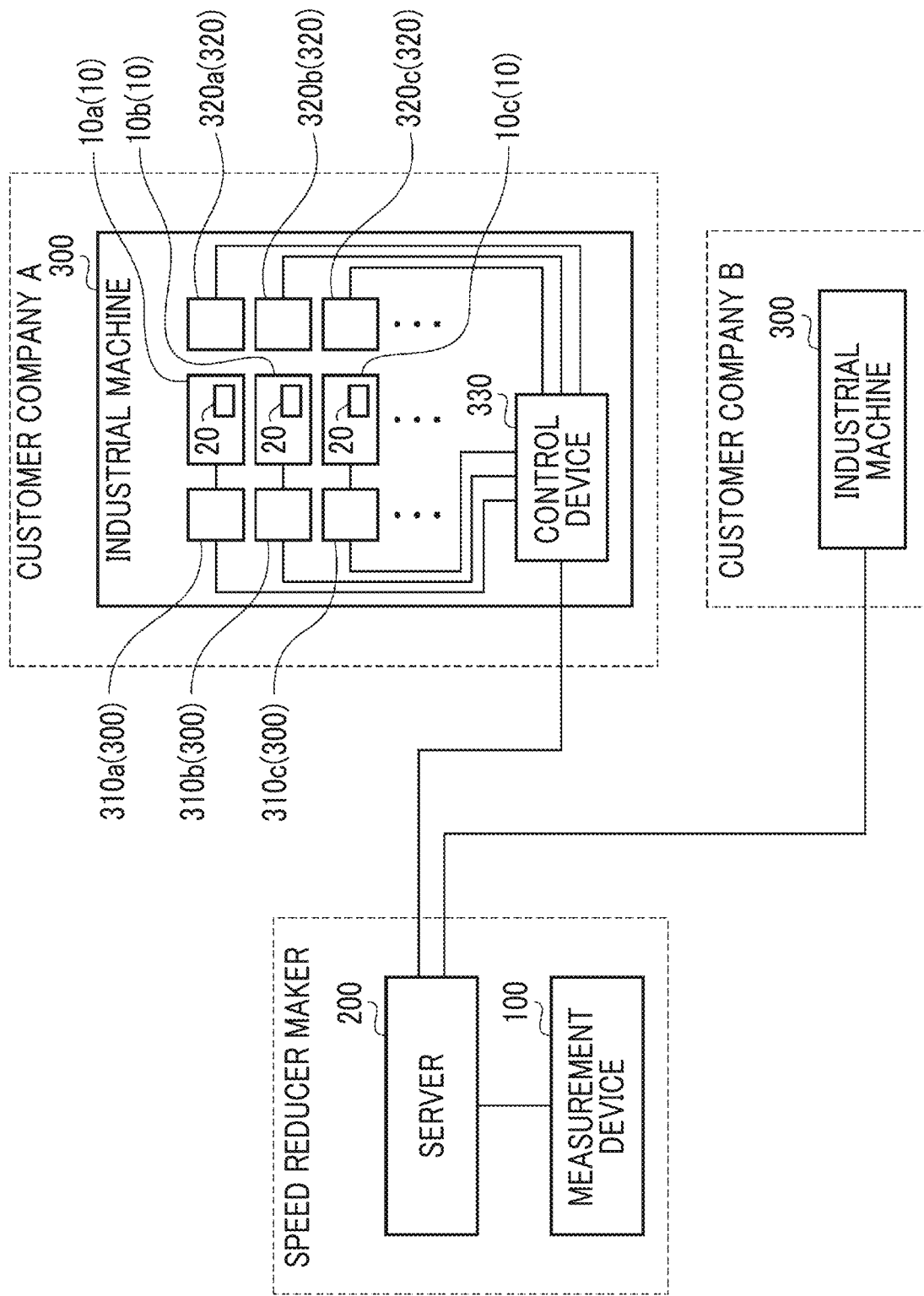
FIG. 13 is a schematic view showing a configuration of an industrial machine supporting system according to a modification example.

FIG. 13 is a schematic view showing a configuration of an industrial machine supporting system 2 according to a modification example. The industrial machine supporting system 2 includes the measurement device 100 and the server 200 managed by the speed reducer maker, and the industrial machines 300 held by the customer company A, the customer company B, . . . , respectively.

The industrial machine 300 includes the motors 310a, 310b, 310c, . . . generically referred to as the motor 310, the speed reducers 10a, 10b, 10c, . . . generically referred to as the speed reducer 10, readers 320a, 320b, 320c, . . . generally referred to as a reader 320, and the control device 330. In the present modification example, unlike the embodiments, the industrial machine supporting system 2 does not have the information processing terminal.

The reader 320 reads the speed reducer ID from the identification information 20 attached to the speed reducer 10. For example, the reader 320 is a predetermined reader such as a one-dimensional code reader or a two-dimensional code reader. As in the above-described modification examples, in a case where the RFID tag in which the identification information 20 is written is attached to the speed reducer 10, the reader 320 may be an RFID reader. The reader 320 transmits the read speed reducer ID to the control device 330.

Figure 14:
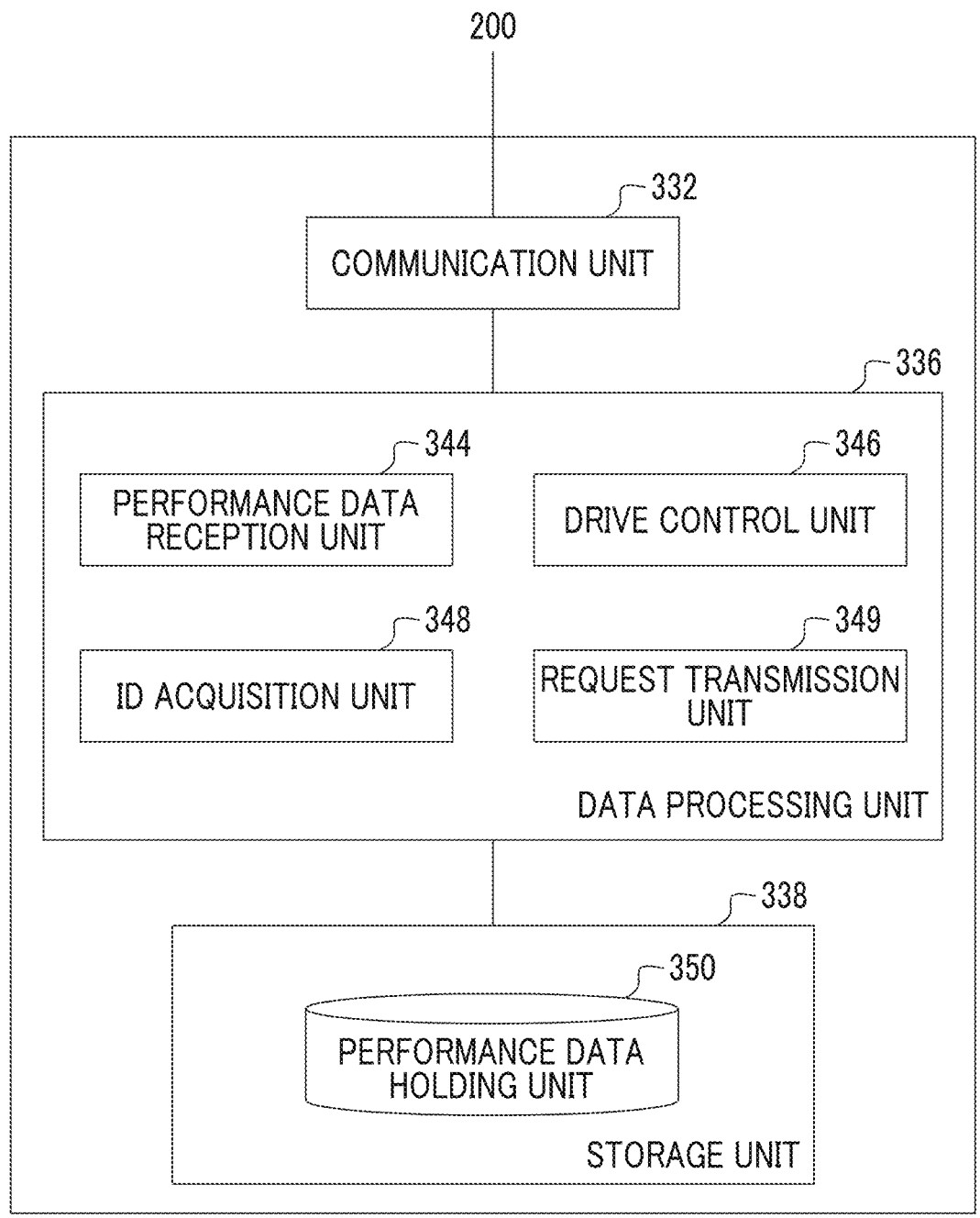
FIG. 14 is a block diagram showing a function and configuration of a control device of the industrial machine of FIG. 13.

FIG. 14 is a block diagram showing the function and the configuration of the control device 330 of FIG. 13. In the present modification example, the data processing unit 336 of the control device 330 includes the performance data reception unit 344, the drive control unit 346, the ID acquisition unit 348, and the request transmission unit 349.

The ID acquisition unit 348 acquires the speed reducer ID transmitted from the reader 320.

The request transmission unit 349 transmits the performance data transmission request including the speed reducer ID acquired by the ID acquisition unit 348 to the server 200.

The performance data reception unit 344 receives the speed reducer ID and the performance data transmitted from the server 200 in response to the performance data transmission request. The performance data reception unit 344 records the received speed reducer ID and the performance data in the performance data holding unit 350 in association with each other.

According to the present modification example, the industrial machine 300 automatically reads the speed reducer ID attached to the speed reducer 10, transmits the performance data transmission request to the server 200, receives the performance data transmitted in response to the performance data transmission request, and controls the operation of the industrial machine 300 based on the received performance data. That is, according to the present modification example, the user does not need to operate the information processing terminal 400 to read the speed reducer ID from the identification information 20 or transfer the performance data transmitted from the server 200 to the industrial machine 300. Accordingly, the burden on the user is further reduced.

In addition, a technical concept of the present modification example can also be applied to a case where the industrial machine 300 requests the update performance data, the control program, or the update control program. That is, the technical concept of the present modification example can be applied to the second and third embodiments. In this case, the industrial machine 300 may include the state monitoring device 500, or the state monitoring device 500 may be provided separately from the industrial machine 300.

Modification Example 5

In the embodiments, the case where the speed reducer 10 is the eccentrically oscillating type speed reducer is described. However, the present invention is not limited to this, and the speed reducer 10 may be another type of speed reducer such as a bending meshing type speed reducer.

Modification Example 6

In the embodiments, the system is described on the assumption that the speed reducer maker delivers the speed reducer alone to the customer company. However, the present invention can be applied to a case where a gear motor in which a speed reducer and a motor are integrated with each other is delivered to a customer company. In this case, the gear motor is associated with the individually identifiable gear motor ID (since the corresponding speed reducer can be identified from the gear motor ID, the gear motor ID can be regarded as the speed reducer ID), and the performance data of the speed reducer, the performance data of the motor, and the performance data of the gear motor are stored in the server and provided to the customer company.

Modification Example 7

In the second and third embodiments, the case where the deterioration related information is the iron powder concentration in the lubricant is described. However, the present invention is not limited to this, and the deterioration related information may be any information which can specify a deterioration state. For example, the deterioration related information may be vibration information of the industrial machine in which the speed reducer is incorporated, specifically, for example, in a case where the industrial machine is a robot and the speed reducer is incorporated in an arm of the robot, the deterioration related information may be vibration information of the arm. In addition, for example, the deterioration related information may be a load on the speed reducer incorporated in the industrial machine and an operating time thereof.

Modification Example 8

In the second embodiment, the case where the update performance data generation unit 217 updates the update performance data based on the deterioration related information included in the performance data update request is described. However, the present invention is not limited to this, and the update performance data corresponding to each deterioration related information may be prepared in advance and stored in the storage unit 206. In this case, the update performance data corresponding to the deterioration related information included in the received performance data update request may be extracted from the storage unit 206.

In the third embodiment, the case where the control program generation unit 218 generates the update control program based on the update performance data generated based on the deterioration related information included in the control program update request is described. However, the present invention is not limited to this. Alternatively, the update control program corresponding to each deterioration related information may be prepared in advance and stored in the storage unit 206. In this case, the update control program corresponding to the deterioration related information included in the received control program update request may be extracted from the storage unit 206.

Modification Example 9

The technical concepts of the embodiments and the modification examples described above can be applied not only to the industrial machine but also to the master machine in which a speed reducer is incorporated, and can also be applied to other master machines such as a humanoid robot and a nursing robot, for example.

Any combination of the above-described embodiments and modification examples is also useful as an embodiment of the present invention. New embodiments resulting from the combination have combined effects of the combined embodiment and modification example. Moreover, it is also understood by a person skilled in the art that a function to be fulfilled by each configuration requirement described in claims is realized by a single substance of each constituent element shown in the embodiments and modification examples or a combination thereof.

The present invention relates to the industrial support system.

It should be understood that the invention is not limited to the above-described embodiment, but may be modified into various forms on the basis of the spirit of the invention. Additionally, the modifications are included in the scope of the invention.

What is claimed is:
1. A master machine supporting system comprising:
a server configured to:
store, for each of a plurality of speed reducers that are measured before being shipped, measured performance data that changes by phase angle of an output shaft, in association with a speed reducer ID of each speed reducer, and
transmit, in response to a performance data transmission request that includes the speed reducer ID, the measured performance data for any of the speed reducers associated with the speed reducer ID; and a master machine comprising one of the speed reducers, wherein the master machine is configured to:
receive, as input performance data, the measured performance data for the one of the speed reducers transmitted from the server, and
control, when the master machine processes the input performance data, an operation of the master machine.

2. The master machine supporting system according to claim 1, wherein the master machine is configured to:
acquire, from the one of the speed reducers, the speed reducer ID of the one of the speed reducers,
transmit, to the server, the performance data transmission request that includes the speed reducer ID of the one of the speed reducers, and
receive, from the server in response to the performance data transmission request, the measured performance data for the one of the speed reducers.

3. The master machine supporting system according to claim 1,
wherein the master machine comprises an additional one of the speed reducers, and
wherein the master machine is configured to:
control, when the master machine processes the input performance data, an operation of the additional one of the speed reducers.

4. The master machine supporting system according to claim 1, further comprising:
a measurement device configured to:
obtain, by measuring the speed reducers, the measured performance data for each of the speed reducers, and
transmit, to the server for each of the speed reducers, the speed reducer ID and the measured performance data.

5. The master machine supporting system according to claim 1,
wherein the server is configured to:
receive, for the one of the speed reducers, a performance data update request that includes the speed reducer ID and deterioration state information specifying a deterioration state of the one of the speed reducers, and
transmit update performance data corresponding to the deterioration state specified from the deterioration state information, and
wherein the master machine is configured to:
receive, for the one of the speed reducers, an input of update performance data, and
control, when the master machine processes the input update performance data, another operation of the master machine.

6. The master machine supporting system according to claim 1,
wherein the master machine comprises:
an additional one of the speed reducers, and
a motor configured to operate the additional one of the speed reducers,
wherein the motor is controllable based on:
the measured performance data for the one of the speed reducers, and
the measured performance data for the additional one of the speed reducers, and
wherein the additional one of the speed reducers is configured to be driven by an operation of the one of the speed reducers.

7. The master machine supporting system according to claim 1,
wherein the master machine is configured to:
request, to the server, the measured performance data, and
wherein the server is configured to:
transmit, in response to the performance data transmission request from the master machine, the measured performance data.

8. The master machine supporting system according to claim 1, wherein the speed reducer ID is different from a speed reducer ID for any other of the speed reducers.

9. The master machine supporting system according to claim 1, wherein the one of the speed reducers comprises identification information that identifies the speed reducer ID.

10. The master machine supporting system according to claim 9, wherein the master machine comprises:
a reader unit configured to read the speed reducer ID based on the identification information.

11. The master machine supporting system according to claim 1,
wherein the measured performance data further comprises information from the group consisting of an angle transmission error, a spring constant, a lost motion, and a hysteresis loss.

12. A master machine which is used in the master machine supporting system according to claim 1.

13. A server which is used in the master machine supporting system according to claim 1.

14. A master machine supporting system comprising:
a server configured to:
store, for each of a plurality of speed reducers that are measured before being shipped, measured performance data that changes by phase angle of an output shaft, in association with a speed reducer ID of each speed reducer, and
transmit, in response to a program transmission request that includes the speed reducer ID, a control program for any of the speed reducers associated with the speed reducer ID; and
a master machine comprising one of the speed reducers, wherein the master machine is configured to:
receive, as an input control program, the control program for the one of the speed reducers, and
control, when the master machine processes the input control program, an operation of the master machine, and
wherein the control program, prior to transmission by the sever, is customized based on the measured performance data.

15. The master machine supporting system according to claim 14,
wherein the server is configured to:
receive, for the one of the speed reducers, a program update request that includes the speed reducer ID and deterioration state information specifying a deterioration state of the one of the speed reducers, and
transmit an update control program corresponding to the deterioration state specified from the deterioration state information, and
wherein the master machine is configured to:
control an operation of the master machine by the update control program which is transmitted from the server and is updated.

16. The master machine supporting system according to claim 14,
wherein the master machine is configured to:
transmit, to the server, the program transmission request that includes the speed reducer ID for the one of the speed reducers.

17. The master machine supporting system according to claim 14, wherein the speed reducer ID is different from a speed reducer ID for any other of the speed reducers.

18. A master machine which is used in the master machine supporting system according to claim 14.

19. A server which is used in the master machine supporting system according to claim 14.

* * * * *